United States Patent
Aloisio et al.

(10) Patent No.: US 11,474,596 B1
(45) Date of Patent: Oct. 18, 2022

(54) SYSTEMS AND METHODS FOR MULTI-USER VIRTUAL TRAINING

(71) Applicant: ARCHITECTURE TECHNOLOGY CORPORATION, Eden Prairie, MN (US)

(72) Inventors: Scott Aloisio, Eden Prairie, MN (US); Dahyun Hollister, Eden Prairie, MN (US); Robert A. Joyce, Eden Prairie, MN (US)

(73) Assignee: ARCHITECTURE TECHNOLOGY CORPORATION, Eden Prairie, MN (US)

( * ) Notice: Subject to any disclaimer, the term of this patent is extended or adjusted under 35 U.S.C. 154(b) by 74 days.

(21) Appl. No.: 16/892,911

(22) Filed: Jun. 4, 2020

(51) Int. Cl.
| | |
|---|---|
| *G06F 3/048* | (2013.01) |
| *G06F 3/01* | (2006.01) |
| *G06N 20/00* | (2019.01) |
| *G06T 19/00* | (2011.01) |

(Continued)

(52) U.S. Cl.
CPC ........... *G06F 3/012* (2013.01); *G02B 27/017* (2013.01); *G06F 3/017* (2013.01); *G06F 11/3003* (2013.01); *G06N 20/00* (2019.01); *G06T 19/006* (2013.01)

(58) Field of Classification Search
CPC ...... G06F 3/012; G06F 11/3003; G06F 3/017; G06N 20/00; G02B 27/017; G06T 19/006
See application file for complete search history.

(56) References Cited

U.S. PATENT DOCUMENTS

| | | |
|---|---|---|
| 6,292,792 B1 | 9/2001 | Baffes et al. |
| 7,574,018 B2 | 8/2009 | Luo |
| 7,920,071 B2 | 4/2011 | Baillot |

(Continued)

FOREIGN PATENT DOCUMENTS

| | | |
|---|---|---|
| KR | 10-2042989 B1 | 12/2019 |
| WO | WO-00/04478 A2 | 1/2000 |

OTHER PUBLICATIONS

"Military Simulation and Virtual Training Market Worth US$15.12 Billion By 2026 CAGR 4.0%," Acumen Research and Consulting, Press Release, Jan. 10, 2019, 3 pages.

(Continued)

*Primary Examiner* — Aleksey Olshannikov
(74) *Attorney, Agent, or Firm* — Foley & Lardner LLP

(57) ABSTRACT

Disclosed herein are embodiments for managing a task including one or more skills. A server stores a virtual environment, software agents configured to collect data generated when a user interacts with the virtual environment to perform the task, and a predictive machine learning model. The server generates virtual entities during the performance of the task, and executes the predictive machine learning model to configure the virtual entities based upon data generated when the user interacts with the virtual environment. The server generates the virtual environment and the virtual entities configured for interaction with the user during display by the client device, and receives the data collected by the software agents. The system displays a user interface at the client device to indicate a measurement of each of the skills during performance of the task. The server trains the predictive machine learning model using this measurement of skills during task performance.

20 Claims, 6 Drawing Sheets

(51) Int. Cl.
*G06F 11/30* (2006.01)
*G02B 27/01* (2006.01)

(56) References Cited

U.S. PATENT DOCUMENTS

| | | | |
|---|---|---|---|
| 8,406,682 | B2 | 3/2013 | Elesseily et al. |
| 9,076,342 | B2 | 7/2015 | Brueckner et al. |
| 9,911,352 | B2 | 3/2018 | Williams et al. |
| 10,068,493 | B2 | 9/2018 | Brueckner et al. |
| 10,083,624 | B2 | 9/2018 | Brueckner et al. |
| 10,346,612 | B1 | 7/2019 | Donovan et al. |
| 10,529,140 | B1 | 1/2020 | Ravindran et al. |
| 2005/0216243 | A1 | 9/2005 | Graham et al. |
| 2009/0046893 | A1* | 2/2009 | French ............... A63B 24/0021 382/103 |
| 2012/0129141 | A1 | 5/2012 | Granpeesheh |
| 2012/0214147 | A1 | 8/2012 | Ernst et al. |
| 2014/0162224 | A1* | 6/2014 | Wallace ................... G09B 5/06 434/219 |
| 2015/0050623 | A1 | 2/2015 | Falash et al. |
| 2015/0099252 | A1 | 4/2015 | Anderson et al. |
| 2015/0154875 | A1 | 6/2015 | Digiantomasso et al. |
| 2016/0019217 | A1 | 1/2016 | Reblitz-Richardson et al. |
| 2016/0063883 | A1* | 3/2016 | Jeyanandarajan ....... G09B 5/06 434/201 |
| 2016/0077547 | A1 | 3/2016 | Aimone et al. |
| 2016/0321583 | A1 | 11/2016 | Jones et al. |
| 2017/0032694 | A1 | 2/2017 | Brueckner et al. |
| 2017/0136296 | A1 | 5/2017 | Barrera et al. |
| 2017/0221267 | A1* | 8/2017 | Tommy ................... G09B 5/125 |
| 2018/0165983 | A1 | 6/2018 | Ragozzino et al. |
| 2018/0203238 | A1 | 7/2018 | Smith, Jr. |
| 2018/0293802 | A1 | 10/2018 | Hendricks et al. |
| 2019/0025906 | A1 | 1/2019 | Strong et al. |
| 2019/0034489 | A1 | 1/2019 | Ziegler |
| 2019/0304188 | A1 | 10/2019 | Bridgeman et al. |
| 2019/0373297 | A1 | 12/2019 | Sarkhel et al. |
| 2020/0012671 | A1 | 1/2020 | Walters et al. |
| 2020/0033144 | A1 | 1/2020 | Du et al. |
| 2020/0135042 | A1 | 4/2020 | An et al. |
| 2021/0027647 | A1* | 1/2021 | Baphna ..................... G09B 7/00 |
| 2021/0043106 | A1 | 2/2021 | Kotra et al. |
| 2021/0335148 | A1 | 10/2021 | Fujiwara et al. |

OTHER PUBLICATIONS

Architecture Technology Corporation, "Cyrin—Virtual Advanced Cyber Training Now With Three Levels of Training Designed for the Utility Industry," Press Release, Corporate Headquarters, https://www.pressrelease.com/files/fb/0f/548a5a42ceeed67a8ace4e5123d2.pdf; Jun. 6, 2019; 10 pages.

Arcnitecture Technology corporation, proposal No. N192-094, N192-094-0032, Jun. 19, 2019.

Dean Putnam, NAVSEA, "Multiplayer Serious Game for Anti-Submarine Warfare Sonar Operator Training," Navy SBIR 2019.2—Topic N192-094, https://www.ncbi.nlm.nih.gov/pmc/articles/PMC1422600/, Accessed Jun. 19, 2019, 3 pages.

John Morgan, "Anti-Submarine Warfare a Phoenix for the Future," Undersea Warfare Magazine, 1998, https://www.public.navy.mil/subfor/underseawarfaremagazine/issues/Archives/issue_01/anti.htm Accessed Jun. 19, 2019, 7 pages.

Kim, Roger G., "Operational planning for theater anti-submarine warfare," Calhoun Institutional Archive of the Naval Postgraduate School, http://hdl.handle.net/10945/53000, Mar. 2017, 52 pages.

Lorne Fade, "How Virtual Reality is Transforming Military Training", https://vrvisiongroup.com/how-virtual-reallty-is-transforming-military-training/. May 30, 2018, 12 pages.

LT Fred C. Lentz, LT Alan B. Shaffer, David R. Pratt, John S. Falby & Michael J. Zyda, "NPSNET: Naval Training Integration," Proceedings of the 13th DIS Workshop, Orlando, Florida, pp. 107-112, ba6cee448ad439f38d8e69ee3bd427fec63b.pdf, Sep. 18-22, 1995, 6 pages.

Roland J. Yardley, Harry J. Thie, John F. Schank, Jolene Galegher, Jessie L. Riposo, "Use of Simulation for Training in the U.S. Navy Surface Force," Rand Corp, National Defense Research Institute, https://www.rand.org/content/dam/rand/pubs/monoqraph_reports/2005/MR1770.pdf, 2003, 123 pages.

Shelly Singh, "Virtual Reality Market worth $53.6 billion by 2025," Press Release, https://www.marketsandmarkets.com/PressReleases/ar-market.asp, 7 pages.

SimCYRIN Phase II proposal (vol. 2) Final, completed Oct. 25, 2015.

SimcYRIN, Simulation Deployment and Management System, ATC-NY, Topic: AF183-006, Proposal#: F183-006-0193.

Stephen Brueckner, Frank Adelstein, David Guaspari, Joseph Weeks (Air Force Research Laboratory); "Automated Computer Forensics Training in a Virtualized Environment," Digital Forensic Research Conference, DFRWS 2008 USA, Aug. 11-13, 2008, 8 pages.

Yariv Levski, "10 Virtual Reality Business Opportunities Poised to Explode," https://appreal-vr.com/blog/10-virtual-reality-business-opportunities/, Copyright © 2020 AppReal-VR, 16 pages.

Yariv Levski, "15 Greatest Examples of Virtual Reality Therapy", htps://appreal-vr.com/blog/virtual-Reality-therapy-potential/, Press Release, Copyright © 2020 AppReal-VR, 15 pages.

"ATCorp Announces Virtual, Online Cyber Security Training for the Utility Industry", https://www.tdworld.com/safety-and-training/article/20972718/atcorp-announces-virtual-online-cyber-security-training-for-the-utility-industry, Jun. 19, 2019, (4 pages).

Chief of Staff, United States Air Force; "Enhancing Multi-domain Command and Control . . . Tying It All Together," https://www.af.mil/Portals/1/documents/csaf/letter3/Enhancing_Multi-domain_CommandControl.pdf, Sep. 18, 2018; 3 pages.

Dahyun Hollister, Phase I SBIR Proposal, "SCENTS, Scenario-based Training Service", Topic Number and Name: A18-092 Scenario-based Training Content Discovery, and Adaptive Recommendation, Architecture Technology Corporation, Feb. 7, 2018, 23 pages.

Maj. Justin Reynolds, Headquarters Air Force Strategic Integration Group, "Multi-domain command and control is coming," https://www.af.mil/News/Article-Display/Article/1644543/multi-domain-command-and-control-is-coming/, Sep. 25, 2018; 3 pages.

Press Release, Corporate Headquarters, Architecture Technology Corporation; "CYRIN—Virtual Advanced Cyber Training Now With Three Levels of Training Designed for the Utility Industry", https://www.pressrelease.com/files/fb/0f/548a5a42ceeed67a8ace4e5123d2.pdf; Jun. 6, 2019; 10 pages.

Vuna Huh Wong, Sebastian Joon Bae, Elizabeth M. Bartels, Benjamin Smith, "Next-Generation Wargaming for the U.S. Marine Corps", Rand Corporation, Nov. 30, 2019; (253 pages).

Non-Final Office Action on U.S. Appl. No. 16/267,252 dated May 25, 2022 (12 pages).

Picoco et al., "Dynamic Event Tree Generation With Raven—MAAP5 Using Finite State Machine System Models," Sep. 25, 2017, pp. 100-106.

* cited by examiner

SYSTEMS AND METHODS FOR MULTI-USER VIRTUAL TRAINING

TECHNICAL FIELD

This application relates generally to computing systems that implement virtual training exercises, and more particularly to computing systems that implement multi-user virtual training exercises within adaptive learning environments.

BACKGROUND

One of the more effective methods of skill acquisition is scenario-based learning. In the case of computer-based training, scenario-based learning may be achieved by providing realistic, hands-on exercises to trainees. Military forces, commercial enterprises, and academic institutions all conduct computer-based training to educate and train personnel. In virtual training, training is conducted when the learner and the instructor are in separate locations or in a virtual or simulated environment.

Virtual training exercises are conducted in both individual and group formats. In the present disclosure, group formats for virtual training are sometimes called multi-user training. Multi-user training exercises may be conducted cooperatively or as competitions. In synchronous virtual training, training participants such as learners and instructors or multiple learners, engage in learning simultaneously and can interact in real-time. Conventional multi-user virtual training exercises can have limitations in presenting realistic training scenarios or tasks that effectively prepare trainees for real world situations. For example, presenting realistic simulations can require emulation of subtle effects in visual or auditory imagery. Conventional training simulations often lack realism, and can fail to engage users or can omit significant knowledge. Conventional virtual training has limitations in preparing users for real world scenarios that require planning for threats and responding to adversary actions. Conventional virtual training may not prepare users to make the most appropriate decision based on initial information and act quickly on that decision, while being ready to make changes as more data becomes available.

SUMMARY

What is therefore desired are virtual training systems that provide individualized adaptive training based upon automated training technology. What is desired are task management aids that provide realistic training scenarios that effectively develop user skills and prepare trainees to handle real-world challenges. What is desired are task management systems that effectively develop user proficiencies in planning for and responding to a range of threats and adversary actions while performing a training exercise or task. What is desired are multi-user virtual training systems that promote knowledge-sharing and efficient collaborative actions within a team.

Embodiments disclosed herein solve the aforementioned technological problems and/or other technological problems. The systems and methods of the disclosure provide trainees in a multi-user training exercise with web-based virtual environments that enable trainees to interact with complex, realistic simulation environments. Advanced simulations incorporate virtual entities that present training challenges to users and that generate additional training skills in response to actions taken by trainees. Self-monitored training tools provide accurate user status and progress monitoring and do not require instructors to monitor the users in real time. In various embodiments, virtual environments may employ virtual reality ("VR") or augmented reality ("AR") display technologies.

Disclosed embodiments include a method and system for managing a task including one or more skills. A server stores a virtual environment, software agents configured to collect data generated when a user interacts with the virtual environment to perform a task, and a predictive machine learning model. The server generates virtual entities during performance of the task, and executes the predictive machine learning model to configure the virtual entities based upon data generated when the user interacts with the virtual environment. The server generates the virtual environment and the virtual entities configured for interaction with the user during display by the client device. The server receives the data collected by the software agents during the training exercise. The server determines one or more additional skills for performance of the task, wherein the one or more software agents monitor the one or more additional skills. The system displays a user interface at the client device to indicate a measurement of each of the skills during performance of the task. The server trains the predictive machine learning model using this measurement of skills during the task.

The server selects one or more software agents configured to collect data generated when a user of a client device performs actions within a virtual environment displayed by the client device. In various embodiments, the software agents also are configured to collect data output by virtual entities when the user performs actions within the virtual environment. The server outputs, for display by the user client devices, a virtual environment and one or more virtual entities. The system receives the data collected by one or more software agents during performance of the task. In response to data collected by the software agents, the server displays a user interface at the client device to indicate a measurement of each of the skills during performance of the task.

In an embodiment, the server is communicatively coupled to a network communication interface configured to host instant messaging between a plurality of client devices associated with respective users.

In various embodiments, one or more software agents are associated with a plurality of skills to be to be demonstrated by a given user during the task. In various embodiments, the plurality of skills to be to be demonstrated by the given user may include cognitive skills demonstrated with respect to one or more interactive virtual objects, and psychomotor skills demonstrated with respect to one or more interactive virtual objects.

In an embodiment, users of respective client devices are members of a team with a plurality of collaborative roles in the task. The plurality of skills to be demonstrated by respective users include collaborative skills to be demonstrated by multiple members of the team.

In an embodiment, the task represents an adversarial scenario, the users of the respective client devices are members of a first team in an adversarial scenario, and the one or more virtual entities represent a second team in the adversarial scenario. In an embodiment, the second team generates virtual entity outputs representative of hostile actions in the adversarial scenario.

In various embodiments, the system executes a predictive machine learning model configured to determine one or more virtual entity outputs representative of additional skills for the user based upon the data received by inputting receive data generated when a user of a respective client device performs actions within the virtual environment.

In various embodiments, one or more software agents are configured to determine metrics for the data generated when the user of the respective client device performs actions within the virtual environment. In an embodiment, the metrics are based upon one or both of the appropriateness of the actions performed and the speed of performance of the actions. In an embodiment, the task management system automatically monitors a state of at least one of the interactive virtual objects when the user of the respective client device performs the actions within the virtual environment, wherein the state includes one or more metrics for determining appropriateness of user actions performed. In various embodiments, these metrics are included in measurements of each of one or more skills demonstrated by a user during the performance of the task.

In embodiments including a plurality of client devices associated with respective users, the virtual environment includes visual and/or auditory images representing presence of each user of a client device. In various embodiments, the virtual environment includes visual and/or auditory images representing presence of each of the one or more virtual entities.

In various embodiments, the server is configured to output a three dimensional ("3D") virtual reality environment including a plurality of interactive 3D virtual objects for display by a near-to-eye display device. In an embodiment, the near-to-eye display device is a head-mounted VR display, and the 3D virtual reality environment provides an immersive experience.

In an embodiment, the predictive machine learning model is continually trained by inputting one or more of mission data, laboratory-performed simulations, and equipment testing and training conducted in real-life conditions.

In an embodiment, a method comprises executing, by a server, one or more software agents configured to collect data generated when a user interacts with a virtual environment to perform a task within the virtual environment on a client device, wherein during performance the task the one or more software agents measure one or more skills for the task; generating, by the server, one or more virtual entities during the performance of the task within the virtual environment; executing, by the server, a predictive machine learning model to configure the one or more virtual entities within the virtual environment based upon the data generated when the user interacts with the virtual environment to perform the task and the one or more skills for the task; generating, by the server for display by the client device, the virtual environment and the one or more virtual entities configured for interaction with the user; receiving, by the server, the data collected by the one or more software agents during the performance of the task within the virtual environment; generating, by the server for display by the client device, a user interface to indicate a measurement of each of the one or more skills during the performance of the task in the virtual environment; and training, by the server, the predictive machine learning model using the measurement of each of the one or more skills. In an embodiment, a system comprises a server; non-transitory machine-readable memory that stores one or more software agents, a virtual environment, and a predictive machine learning model, and wherein the server in communication with the non-transitory machine-readable memory executes a set of instructions instructing the server to: execute the one or more software agents configured to collect data generated when a user interacts with the virtual environment to perform a task within the virtual environment on a client device, wherein during performance the task the one or more software agents measure one or more skills for the task; generate one or more virtual entities during the performance of the task within the virtual environment; execute the predictive machine learning model to configure the one or more virtual entities within the virtual environment based upon the data generated when the user interacts with the virtual environment to perform the task and the one or more skills for the task; generate, for display by the client device, the virtual environment and the one or more virtual entities configured for interaction with the user; receive the data collected by the one or more software agents during the performance of the task within the virtual environment; determine one or more additional skills for performance of the task, wherein the one or more software agents monitor the one or more additional skills; generate, for display by the client device, a user interface to indicate a measurement of each of the one or more skills during the performance of the task in the virtual environment; and train the predictive machine learning model using the measurement of each of the one or more skills.

BRIEF DESCRIPTION OF THE DRAWINGS

The accompanying drawings constitute a part of this specification and illustrate embodiments of the subject matter disclosed herein.

DETAILED DESCRIPTION

Figure 1:
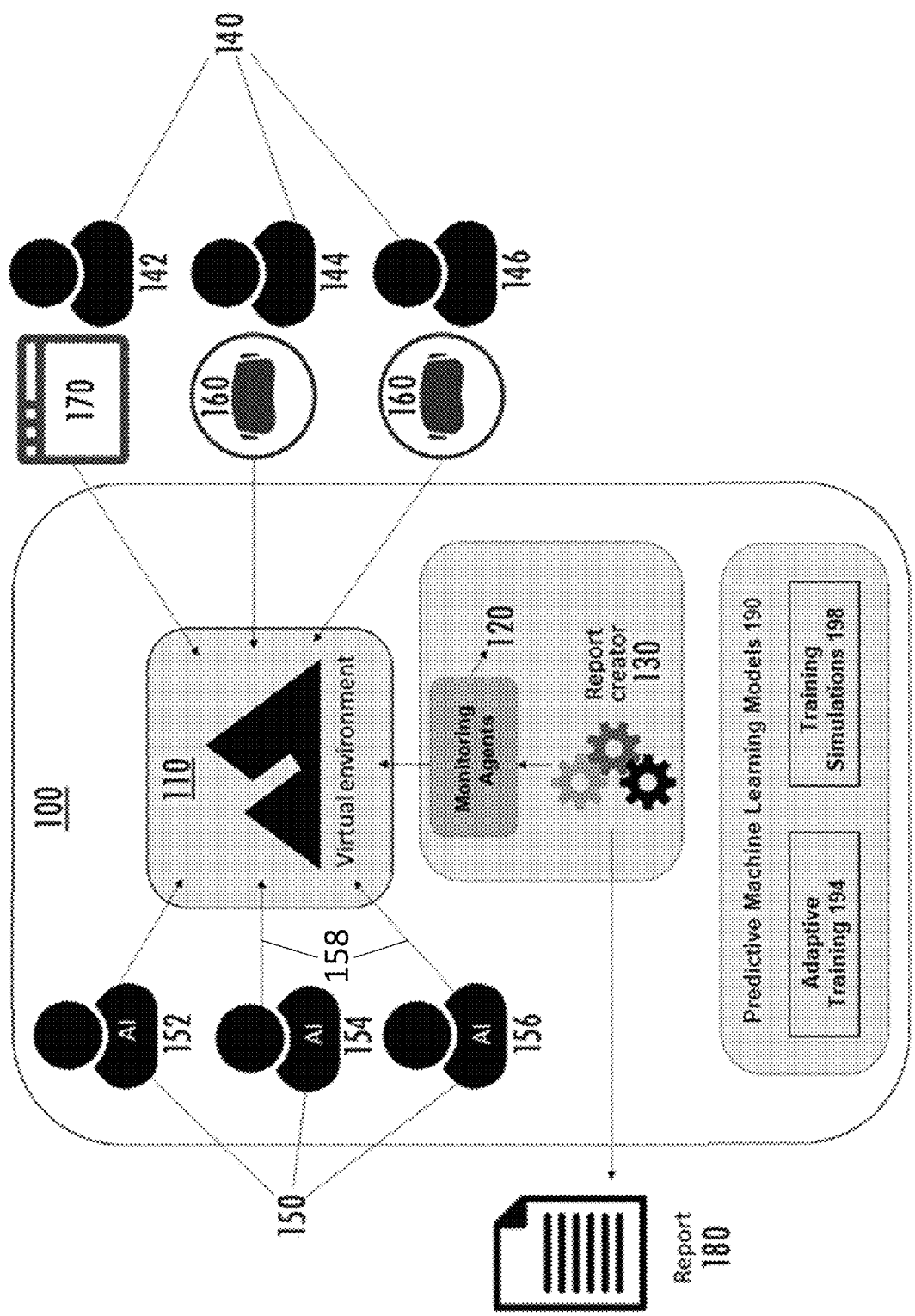
FIG. 1 is a block diagram illustrating an example virtual training system that includes a virtual training environment, virtual entities, and monitoring agents, according to an embodiment.

References will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

Computer-based training may be one of the more effective teaching methods available today, as evidenced, for example, by the military's dedication to training exercises in preparation for battle (e.g., flight simulators). Computer-based training exercises may cover a wide array of training topics, and trainees may have the flexibility of performing training exercises using either local or remote computer connections. Trainees may even obtain online training via the Internet.

Significant effort may be required to devise mission scenarios for computer-based training that employs virtual training technology to create training scenarios and environments. Virtual training may present training scenarios concurrently to multiple users as members of a collaborative team. Additionally, virtual training may present adversarial training scenarios involving opposing teams, such as a "blue team" and a hostile "red team." The methods and systems of the present disclosure combine the advantages of automated, objective monitoring and assessment of training exercises, with collaborative training in networked multi-user training environments. In the present disclosure, "collaborative training" may refer to virtual training in which two or more individuals learn together on their own or in a larger group setting. In an embodiment, collaborative training incorporates collaboration tools, i.e., software tools that allow two or more trainees to work together to solve a problem or work on a predefined task.

Additionally, the methods and systems of the present disclosure provide networked multi-user training within enhanced training simulations incorporating virtual entities such as hostile actors in adversarial training scenarios. In virtual training techniques of the present disclosure, virtual entities can respond to trainee actions within a virtual environment to support adaptive training scenarios that can be customized to individual users' performance and training needs.

Embodiments disclosed herein employ near-to-eye displays to display immersive virtual environments. As used in the present disclosure, near-to-eye displays are display devices that incorporate some sort of near-to-eye optical system to emit a light image, generally located within a few centimeters of the human eye. Near-to-eye displays allow the user to view a scene at a perspective such that it appears to the eye as watching a high definition display screen at some distance. One type of near-to-eye display is a head-mounted display ("HMD"). As used in the present disclosure, a HMD is a near-to-eye display device worn on or about the head. Single eye head-mounted displays are referred to as monocular HMDs while dual eye head-mounted displays are referred to as binocular HMDs. HMDs can be integrated, e.g., in a helmet, eye wear or goggles.

Disclosed embodiments employ VR display technology to provide immersive, 3D virtual training environments. As used in the present disclosure, a VR display denotes near-to-eye displays that display only a computer generated image ("CGI"), as well as near-to-eye displays that display CGI in combination with a real-world physical environment. The latter type of VR display is sometimes called an AR display herein. Typically, AR displays employ HMDs with see-through near-to-eye displays that are worn by users to view mixed imagery of virtual and real-world objects.

According to one or more aspects, these systems use agents that are deployed on an exercise network to collect exercise data and provide interactive graphical user interface displays that assist evaluators with planning and monitoring virtual training exercises and evaluating trainee performance. These flexible agents support a wide variety of virtual training platforms and missions, thereby potentially eliminating the need for expensive or inadequate custom-built solutions. A fine-grained situational awareness provided by these systems during virtual training exercises can, in some cases, be used to improve classroom training and thereby improve the overall effectiveness of the training experience. Graphic user interface reports may also be provided to assist in planning and monitoring an exercise and analyzing its results.

An example of a field of application of the virtual training methods and systems of the present disclosure is Anti-submarine Warfare ("ASW"). Anti-submarine warfare is a branch of underwater warfare that uses surface warships, aircraft, or other submarines to find, track, and deter, damage, or destroy enemy submarines. ASW remains a vital defense at sea. With advancing technology, new undersea threats are developed frequently. It is critical that the men and women at the front lines of ASW are highly trained to identify and repel any threat at sea. The best way for ASW personnel to obtain training is to use high-fidelity training environments incorporating the equipment pertaining to ASW, such as a sonar system. However, due to classification and the difficulty of putting tactical systems into a training environment, it is difficult to train personnel with tactical equipment.

Scenario-based training has proved in many cases to be an effective way of training in various occupations such as first responders, pilots, and military service. Many trainees learn faster and more effectively if they are put into a real-life situations, rather than through books and lectures. However, it may not be safe to put trainees, who have yet to gain significant experience or knowledge, in the field and teach them as they go, especially in a regimen such as ASW where a single decision can result in a catastrophic outcome.

ASW is a military specialty that requires one of the most difficult programs of complex and varied training, in which personnel must be skilled in different tasks. The great variety of ASW skills include, for example, environment assessment, display manipulation, proper use of automation, signal recognition, and development of solutions for weapon deployment and evasive maneuvers.

Disclosed embodiments provide a training platform and gamification, e.g., team game scenarios, to effectively train personnel in a wide variety of skills. These team game scenarios enable training to present real-life scenarios, such as ASW scenarios requiring high levels of collaboration. In the present disclosure, "gamification" may refer to a process of applying gaming designs and concepts to training scenarios. In various embodiments, gamification refers to a team game experience in which a trainee competes against or collaborates with other trainees. In various embodiments, gamification refers to a game experience in which a trainee competes with artificial intelligence (AI) technology.

Embodiments disclosed herein use VR technology and AI to provide a lifelike environment with efficient, realistic training simulations. Combining authentic simulation of tactical systems with realistic training scenarios greatly improves the virtual training experience. In some embodiments, scenario-based training employs a realistic story line and events to provide an authentic, effective environment for learning various skill sets required by ASW personnel. Training scenarios that include virtual entities enhanced by machine learning help ASW personnel to be ready to quickly respond and repel any threat they will face at sea.

FIG. 1 is a block diagram illustrating an example virtual training system 100. In the present disclosure, "virtual training" or "task management" may refer to training done in a virtual or simulated environment, or when the trainee(s) and the instructor are in separate locations. In various embodiments virtual training may be provided in a training session, also herein called a task. "Virtual training" is sometimes abbreviated as "VT" herein.

Virtual training system 100 includes a virtual training environment module 110, also called a virtual environment module. In the present disclosure, "virtual environment" may refer to a simulated environment for a training exercise that includes observable objects and other observable entities. In various embodiments, virtual environments include interactive virtual objects that can respond to actions by trainees or virtual entities. In various embodiments, virtual environment module 110 is configured to present a multi-player team game experience.

In an embodiment, task management system 100 is configured to communicate with a plurality of users in a task within the virtual environment 110. Users are sometimes called trainees or players herein. As shown, trainees 140 are associated with three user devices 142, 144, 146. In an embodiment, task management system 100 is a server-based system, and user devices 142, 144, 146 are client devices. In the present disclosure, a "user" or "trainee" may refer to an individual or group of people obtaining or acquiring new skills, behaviors, knowledge, or values.

In an embodiment, user device 142 is communicatively coupled to a web browser 170, and user devices 144, 146 are communicatively coupled to VR head-mounted displays 160. Although the example embodiment describes the use of VR, it is intended that the methods and systems described herein can be configured for the use of AR. Although a real-world view is presented in addition to CGI in AR, the functionality of the disclosed embodiments is similar.

In an embodiment, user devices 142, 144, 146 are coupled to a network for VT team communications. In various embodiments, an instant messaging platform supports social network-like communication during a task in which players can communicate with their teammates in real time. In an embodiment, instant messaging permits players to collect information and solve problems as a collective group, as they would do in actual work teams such as ASW teams. In an embodiment, the instant messaging platform allows organizing communications by channels for group discussions among participants in collaborative training exercises, including exchange of private messages within these channels. In an embodiment, the instant messaging platform may serve as a chat room of a training enterprise.

Virtual training system 100 includes several virtual entities 150, including virtual entities 152, 154, 156. In the present disclosure, "virtual entity," also herein called "AI entity," may refer to a virtual entity that can take actions within a virtual environment and that can generate virtual entity outputs. In various embodiments, virtual entities may simulate opponents or hostile actors. In an embodiment, Virtual entities 150 simulate opponents in a multi-player VT game.

In various embodiments, monitoring agent 120 includes one or more deployable agents, which are configurable software agents that are deployed during game play. In some embodiments, monitoring agent 120 collects data relating to how the task (game) was played out, the actions that players 140 have taken, and the difficulty presented by enemy AI entities 150. In an embodiment, monitoring agent 120 incorporates remote agent technology for performing forensic investigations.

Monitoring agents 120 automatically monitor data generated when a user interacts with a virtual environment to perform a task within the virtual environment on a client device, also herein called VT observables, within the virtual environment 110. In the present disclosure, "VT observables" may refer to observable objects within a virtual training environment, either arising from actions by trainees 140 or generated by virtual entities 150. In various embodiments, VT observables may include one or both of data generated by user actions and outputs generated by virtual entities.

In the present disclosure, monitoring agents monitor data within a virtual training environment arising from actions by trainees. The data may include observable objects arising from actions by trainees that can demonstrate one or more skills by a trainee during a virtual training exercise. Software agents monitor output generated by virtual entities in response to agents taken by trainees. These virtual entity outputs may represent additional skills to be performed by a user during performance of a task. The task may originally require that a trainee interact to demonstrate a first set of skills for completion of a task, and the system may monitor the virtual training environment to require a second set of skills to complete the task, where the second set of skills are based on changes in the virtual training environment or virtual entity outputs.

Data analytics module 130 (also called report creator 130) automatically generates data analyses for training exercises and reports 180 of training exercises. In various embodiments, data analyses and reports include measurements of one or more skills demonstrated by the trainees 140 during the task, and of other events and metrics arising during the task. In various embodiments, module 130 receives data collected by monitoring agents 120, and incorporates data analytics for interpreting the data to derive events and metrics of the task including skills demonstrated by users or groups of users. In an embodiment, data analytics 130 generates skills measurement data during training exercises. In an embodiment, skills measurement data includes a measurement of each of the skills demonstrated by one or more users 140 during the performance of the task in the virtual environment. In an embodiment, skills measurement data further includes metrics used to determine if one or more skills have been demonstrated (e.g., metric parameters 342, FIG. 3). In an embodiments, data analytics 130 incorporates predictive machine learning technology for evaluating trainee performance in adaptive training.

In various embodiments, multiple trainees 140 within VT network 100 have access to the same virtual training environment 110. In various embodiments, an exercise management server executes a multi-trainee training environment including some or all of the following features: representations of presence of each trainee, e.g., via representative objects or avatars; visual indicator of location of each trainee; trainee IDs to control access privileges and trainee monitoring; synchronization of training exercise state; multiple trainee viewpoints; and multiple interaction event locations.

In various embodiments, multiple AI entities (virtual entities) 150 within network 100 are present in the same virtual training environment 110. In various embodiments, an exercise management server executes a training environment including some or all of the following features: representations of presence of each virtual entity, e.g., via representative objects or avatars; visual indicator of location of each virtual entity; virtual entity identifiers to control monitoring of virtual entities; synchronization of training exercise state; multiple virtual entity viewpoints; and multiple interaction event locations.

In an embodiment, virtual entities 150 are programming objects, such as C++ objects. In an embodiment, virtual entity programming objects 150 provide mapping between nodes, observables, and variables in a task or training exercise. Virtual entity programming objects 150 represent nodes in a task or training scenario 100, which can receive inputs and generate outputs during performance of the task. In an embodiment, when generating a task or scenario including a virtual environment 110 and monitoring agents 120, the training server generates virtual entities 150 using object-orientation calls to an API managing the training exercise or task. In an embodiment, as part of a procedure for generating virtual entities 150 in a training exercise or task, the server establishes settings for the virtual entities such as variables associated with skills to be demonstrated by a user 140 while performing the task within the virtual environment 110.

Figure 3:
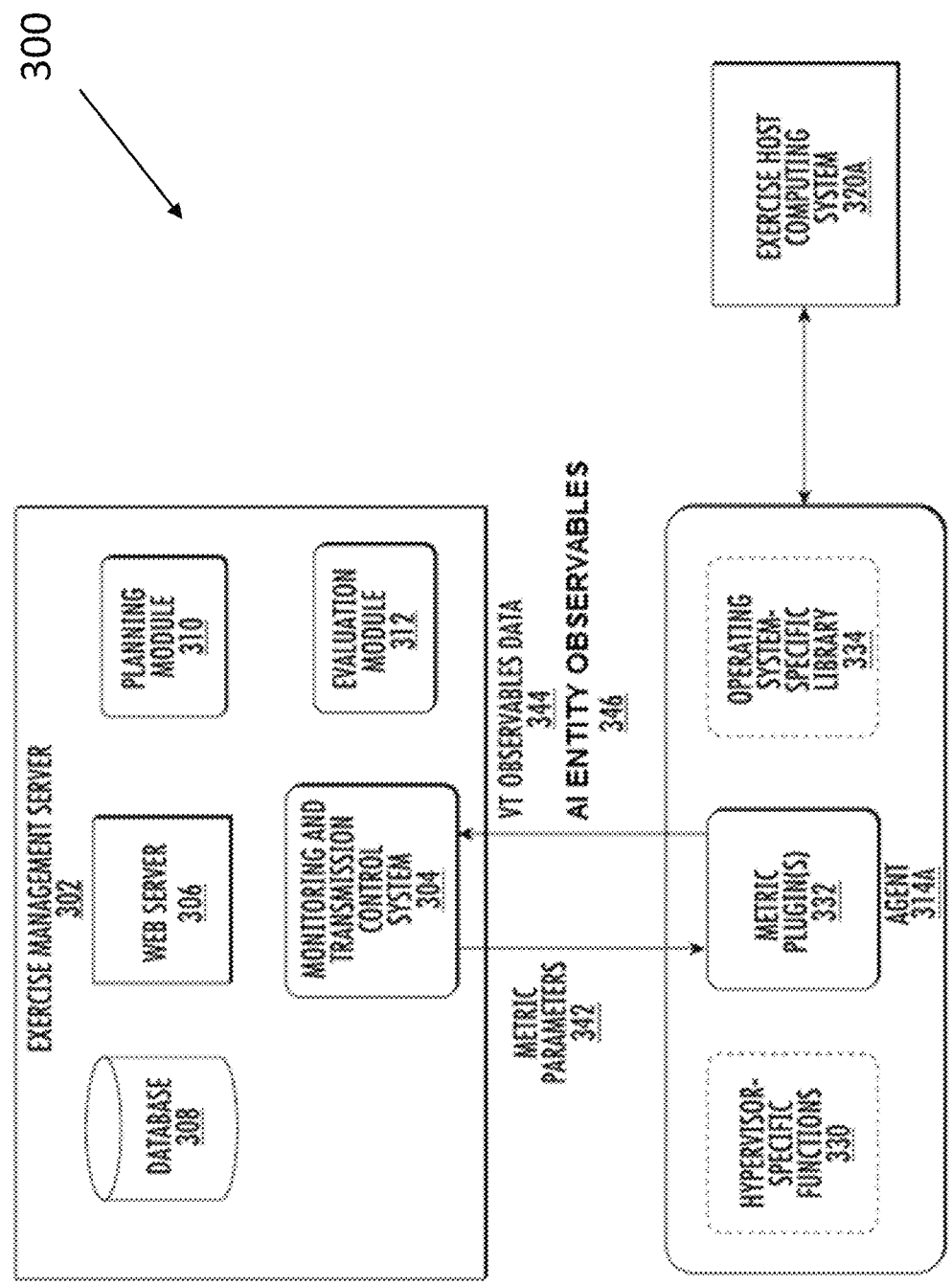
FIG. 3 is a block diagram illustrating an example agent and an example exercise host computing system, according to an embodiment.

In various embodiments, virtual entity programming objects 150 provide mapping to observables of the training environment. In an embodiment, these observables include data generated when a user 140 interacts with virtual environment 110 to perform a task within the virtual environment 110 on a client device (e.g., client device 170). Data generated when a user interacts with virtual environment may include VT Observables Data 344 (FIG. 3). Observables of the training environment may include virtual entity outputs 158, e.g., outputs generated by virtual entities 150 upon interacting with the data generated when a user interacts with the virtual environment 110. Data generated when a user interacts with virtual environment may include AI Entity Observables 346. Monitoring agents 120 monitor these observables, such as VT Observables Data 344 and AI Entity Observables 346.

In various embodiments, virtual entity programming objects 150 provide mapping to variables in a task or training exercise, including without limitation variables associated with functions of virtual entities during performance of the task; settings for virtual entities 150 assigned when generating the virtual entities at the outset of a task; variables resulting from further configuration of virtual entities 150 during performance of the task; variables associated with presence of various virtual entities 152, 154, 156 within the virtual environment 110; and variables associated with visual and/or auditory images representing the virtual entities within the virtual environment 110, e.g., as elements of a realistic training simulation.

In an embodiment, the training server executes a predictive machine learning model 190 to configure virtual entity programming objects 150 during performance of the task. In various embodiments, the predictive machine learning model provides adaptive virtual training that updates a task based on user performance during the task. In an embodiment, during performance of the task, the predictive machine learning model configures one or more of virtual entities 150 by inputting into the model data generated when a user 140 interacts with the virtual environment 110 to perform the task. In an embodiment, other inputs to the model may include one or more skills to be demonstrated by a user 140 during performance of the task and metrics used to determine if the one or more skills have been demonstrated (e.g., metric parameters 342).

In an embodiment, a predictive machine learning model 190 includes one or more component machine learning models that are trained on various sets of training data. Suitable machine learning model classes include but are not limited to: random forests, logistic regression methods, support vector machines, gradient tree boosting methods, nearest neighbor methods, and Bayesian regression methods.

In an embodiment, the predictive machine learning model 190 includes an adaptive training model component 194. Model training curates a data set of skills measurement data generated during training exercises. Model training data for adaptive training can include a measurement of each of the skills demonstrated by one or more users during the performance of the task in the virtual environment. Model training data for adaptive training can include metrics used to determine if one or more skills have been demonstrated (e.g., metric parameters 342).

In an embodiment, the predictive machine learning model 190 includes a training simulations model component 198. Model training curates a data set of data associated with visual and/or auditory images representing the virtual environment and representing virtual entities within the virtual environment. Model training data for training simulations can include one or more of mission data, laboratory-performed simulations and equipment testing and training conducted in real-life conditions. Model training data for training simulations can include visual and/or auditory images for a three dimensional (3D) virtual reality environment.

Figure 2:
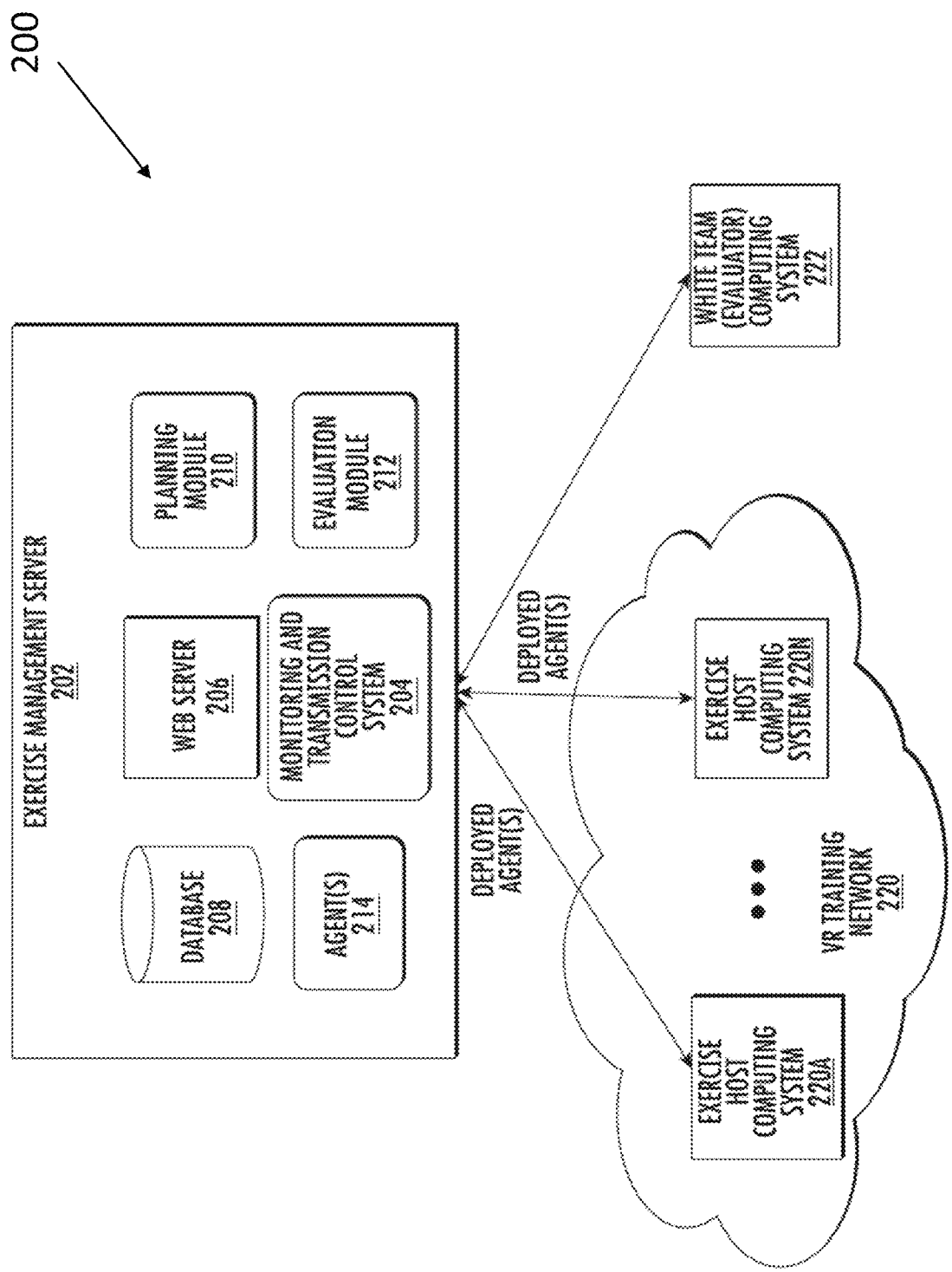
FIG. 2 is a block diagram illustrating an example training environment that includes one or more exercise host computing systems and an exercise management server, according to an embodiment.

FIG. 2 is a block diagram illustrating an example environment that includes one or more exercise host computing systems 220A-220N (collectively, "VT host computing systems" or "exercise host computing systems 120") and an exercise management server 202, according to one or more aspects of the present disclosure. In various examples, exercise management server 202 may comprise a system including one or more processors. VT host computing systems 220 may comprise a heterogeneous training exercise network of computing systems that are communicatively coupled to exercise management server 102 via one or more networks, such as one or more wired and/or wireless networks. Exercise host computing systems 220 may comprise one or more servers, domain controllers, workstations, or other computing devices that are used by individual trainees. As shown in FIG. 2, exercise management server 202 includes a monitoring and transmission control system 204, a web server 206, a database 208, a planning module 210, an evaluation module 212, and one or more agents 214. If the VT network includes one or more firewalls, one or more firewall rules may be set up to redirect traffic from a given firewall to appropriate networks of exercise host computing systems 220.

One or more evaluators may use a white team (evaluator) computing system 222, which is communicatively coupled to exercise management server 202, e.g., via one or more wired and/or wireless networks. In the present disclosure, "evaluators" may refer to professionals who assess trainees' knowledge and who help build upon this knowledge during training via skills acquisition. In an embodiment, evaluators maintain skill acquisition files to track skills demonstrated by trainees during performance of tasks. Prior to an exercise, evaluators may use the planning module 210 to capture an existing virtual training network or to design a new network, and may create a monitoring and scoring plan for the exercise. The use of the planning module 210 results in a set of dynamic, web accessible briefing documents to orient both evaluators and trainees on the exercise and expectations. Planning module 210 also configures a set of one or more modular agents 214 and objective metrics for use during the exercise. Communication between the agents and exercise management server 202 may be encrypted, such as via the Secure Sockets Layer (SSL) protocol.

While a training exercise is conducted, monitoring and transmission control system 204 deploys agents 214 onto one or more of exercise host computing systems 220 of the virtual training network and receives exercise data back from exercise host computing systems 220. Agents 214 monitor trainee performance while the planning and evaluation modules 210, 212 assist evaluators in developing briefings, monitoring exercises, and delivering debriefs. Evaluators use the output of evaluation module 212 to visualize the exercise data provided by agents 214 during the training session, such as team or individual scores. The exercise data is stored in database 208 of the exercise management server 202. Evaluation module 212 provides analysis tools, including playback capabilities, and produces a set of dynamic documents to assist evaluators with debriefing and after action reports. Planning and evaluation modules 210, 212 may be implemented as web applications that interface with backend data stored in database 208 and that may, in some cases, be deployed onto white team (evaluator) computing system 222. Evaluators can therefore access such data in many ways using computing system 222 and/or exercise management server 202, including wirelessly via mobile devices or remotely via the Internet.

Agents 214 deployed by exercise management server 202 do not necessarily require any pre-installed infrastructure on exercise host computing systems 220, which reduces the effort required to deploy agents 214 and accommodates dynamic changes to exercise networks. Agents 214 may emphasize the forensic principle of non-interference by minimizing their footprint within an exercise, both temporally and spatially, which may add to the realism of an exercise. Agents 214 can be ephemeral, such that they do not necessarily have to stay resident on exercise host computing systems 220 over extended amounts of time, which can reduce the chance that trainees will be able to "game the system" by observing or altering agents 214.

Agents 214 can be launched on demand or run throughout the exercise, so exercise management server 202 can use either a pull model or a push model for data acquisition from the agents. The pull model is, in some cases, more flexible and has a lighter footprint, but the push model may, in certain cases, have better performance. Agents 214 can operate on physical hosts over the exercise's test range network or can operate on virtual machines directly through the hypervisor, without leaving any traces on the network. Exercise host computing systems 220 may comprise one or more virtual machines. In some examples, agents 214 use a three-layer modular design that includes a number of pre-built plugins for hypervisors, operating systems, and performance metrics. This provides the flexibility to support a wide variety of platforms and missions.

In various non-limiting examples, there are seven common steps or aspects in building a virtual training exercise: objectives, approach, topology, scenario, rules, metrics, and lessons learned. In one use case, it is assumed that the evaluators have already identified objectives, approach, topology, scenario, and rules.

Exercise host computing systems 220 illustrated in FIG. 2 may execute one or more operating systems (e.g., Windows or Linux). These computing systems 220 may execute natively compiled ones of agents 214 that dynamically load natively compiled plugins. These plugins measure specific types of metrics during an exercise. Along with the plugins, parameters are passed to the agents that specify the behavior of the plugin, including what data it collects and how long it should run. For example, an agent may be compiled to run on Windows, load a plugin designed to inspect a Windows host's network configuration, load parameters that specify that the plugin return a list of open network ports to exercise management server 202, and then terminate. This list is used to inform assessment functionality. For example, a trainee may be required to secure a host by filtering certain ports.

As a non-limiting example, one of agents 214 may comprise a file watcher agent that stays resident on a target exercise host computing system of systems 220 and alerts exercise management server 202 as to changes in files. Its parameters include a list of files and/or directories to watch and how long to continue watching. It will notify exercise management server 202 when a file changes and indicate the nature of the change (e.g., file was created, renamed, written to, read or deleted). As another example, one of agents 214 may comprise a session monitor agent that returns a list of user login/logout events. This agent can be parameterized to return this list and terminate, or to stay resident and notify exercise management server 202 of any further logins/logouts as they occur.

Agents 214 may be configured for execution on one or more different types of architectures or operating systems, such as, for example, the Windows and/or Linux platforms. In general, the test range network comprising exercise host computing systems 220 may be a heterogeneous network that supports multiple different types of hardware architectures and operating systems. Agents 214 may also include one or more hypervisor agents, which are agents that do not deploy directly onto exercise host computing systems 220 in the test range network, but instead onto virtual machine platforms that host exercise host computing systems 220. Hypervisor agents may not leave any footprint (e.g., packets, network connections) on the exercise network for trainees to see. Further example details of one of agents 214 are illustrated below in FIG. 3.

During training exercises that are performed using exercise management server 202, exercise host computing systems 220, and evaluator computing system 222, trainees can be evaluated according to whether they accomplish high-level learning objectives. These trainees are able to meet each objective by demonstrating one or more skills during a task. Demonstration of a skill can be measured with a set of metrics. These metrics for measurements of skills can be calculated from task observables. In the present disclosure, task observables are generally represented by data resulting from trainee actions (sometimes called VT observables data herein) and outputs generated by virtual entities (sometimes called AI entity observables herein). Task observables may include information regarding: a speed or rate of a user's actions; location of an action, selection, or view within the virtual environment; a path travelled by the user with relation to interactive virtual objects and/or virtual entities; a time or speed for the path travelled by the user with relation to interactive virtual objects and/or virtual entities; and/or a selection of an action or other interaction from a set of possible actions. AI entity observables include, for example, virtual entity outputs representative of additional skills for a user based upon the data received by the virtual entity from the user's client device during performance of the task. In addition, AI entity observables can provide difficulty metrics for skill measurements.

In various embodiments, there can be at least two types of task observables: measurements (e.g., determination of the state of a virtual training environment at a point in time) and events (changes to the state of virtual environment at a point in time or during a period of time, e.g., resulting from a trainee interaction with the virtual environment). In an embodiment, task observables include measurements of the state of a virtual entity immediately following a trainee interaction with the virtual entity. In an embodiment, task observables include interaction event data, representative of a trainee interaction with one or more interactive 3D virtual objects within a virtual 3D training environment while the trainee performs actions within a virtual 3D training environment. Agents 214 are configured to gather task observables from exercise host computing systems 220 in the VR training network, and these task observables are used by exercise management server 202 to calculate one or more metrics that are displayed by evaluation module 212.

As shown in the example of FIG. 2, exercise management server 202 includes database 208, web server 206, and monitoring and transmission control system 204. In certain non-limiting examples, database 208 may comprise a standalone SQLite database that is linked to web server 206. Monitoring and transmission control system 204 may include or use two sub-components: an aggregator and remote command modules, which are operable to interact with remote agents deployed across the virtual training network.

One or more techniques of the present disclosure may provide a method that includes outputting, for display by exercise management server 202, a graphical user interface ("GUI") report associated with a training exercise, wherein the GUI report includes graphical representations of one or more skills to be demonstrated by the trainee during the training exercise, and wherein the GUI report graphically indicates that the one or more skills have not yet been demonstrated by the trainee. Exercise management server 202 may select one or more software agents of agents 214 that are associated with the one or more skill nodes. Exercise management server 202 may provide an indication of the one or more software agents to be executed during the training exercise to at least one host computing system of exercise host computing systems 220. In various embodiments, exercise management server 202 sends the one or more software agents for execution by the at least one host computing system, wherein the one or more software agents are configured to collect task observables from the at least one host computing system while the trainee performs actions during the training exercise. Exercise management server 202 receives from the at least one host computing system the task observables collected by the one or more software agents during execution, and determines, based on the task observables, that the one or more skills have been demonstrated by the trainee during the training exercise. Responsive to determining that the one or more skills have been demonstrated, exercise management server 202 is capable of updating for display the GUI report to graphically indicate that the one or more skills have been demonstrated by the trainee during the training exercise.

FIG. 3 is a block diagram illustrating an example agent 314A and an example exercise host computing system 320A, in accordance with one or more techniques of the present disclosure. Agent 314A is an example of one of agents 214 illustrated in FIG. 2 that may be deployed by exercise management server 302, and exercise host computing system 320A is an example of one of exercise host computing systems 220 illustrated in FIG. 2.

In the example of FIG. 3, the agent design provides the flexibility to run on a wide variety of target systems, such as exercise host computing system 320A. As described above in reference to FIG. 2, agents 214 may include one or more hypervisor agents, which are agents that do not deploy directly onto exercise host computing systems 220 in the task management network, but instead onto virtual machine platforms that host exercise host computing systems 220. Exercise host computing systems 220 may comprise one or more virtual machines. Hypervisor agents may not leave any footprint (e.g., packets, network connections) on the exercise network for trainees to see. In the example of FIG. 3 agent 314A may, in some non-limiting cases, comprise a hypervisor agent that comprises one or more hypervisor-specific functions 330.

In these cases, hypervisor-specific functions 330 may provide access to the one or more virtual machines. In one example, a console can be established through a virtual machine's virtual serial port. In one example, a Virtual Machine Communications Infrastructure (VMCI) provides communication between a virtual machine and a host operating system of host computing system 320A using a socket interface. In one example, a Host-Guest Communication Manager (HGCM) allows a virtual machine to call a shared library on host computing system 320A.

In some examples, however, agent 314A may not comprise a hypervisor agent and may not include hypervisor-specific functions 330. In these examples, agent 314A may be deployed directly on exercise host computing system 320A.

FIG. 3 shows that agent 314A can be equipped with one or more metric plugins 332 to collect and provide monitoring and transmission control system 304 of exercise management server 302 with task observables during a training exercise using exercise host computing system 320A. In this embodiment, task observables include one or both VT observables data 344 and AI entity observables 346. Furthermore, the metric plugins 332 can be parameterized to further broaden their application for increased flexibility. Metric plugins 332 may be parameterized by receiving, for example, one or more metric parameters 342 from monitoring and transmission control system 304.

Once deployed, an agent, such as agent 314A, is a program that executes and that may have a callback interface for returning information to monitoring and transmission control system 304. Agent 314A may run with administrator privileges to ensure maximum access.

In general, agent 314A and metric plugins 332 can be written to provide a wide range of functions. The following are non-limiting examples of the types of agents that may be implemented: First, a general execution agent is an agent that runs an arbitrary shell command on exercise host computing system 320A. This type of agent can be parameterized (e.g., by receiving metric parameters 342 from monitoring and transmission control system 304 to return all standard output/standard error results from exercise host computing system 320A or return only results including a regex). Second, a process monitor agent is an agent that uses an application programming interface of the operating system of exercise host computing system 320A to acquire a list of processes running on exercise host computing system 320A. This type of agent can be parameterized to return the full list or only return processes that match a given regular expression. Third, a remote connection agent is an agent that uses host computing system's network access to attempt connections to another host. This type of agent can be parameterized with the Internet Protocol address and port number of exercise host computing system 320A, and optionally a client protocol to emulate. The agent will return success or failure of the attempted connection, and can also return any packets received from exercise host computing system 320A. Fourth, a registry monitor agent is an agent that monitors the registry of exercise host computing system 320A for key changes. This type of agent can be parameterized to monitor only keys matching a regex, and will return the new value of any keys. Fifth, a time check agent is an agent that executes on each target (e.g., on exercise host computing system 320A) at the beginning of an exercise (e.g., at a minimum) so exercise management server 302 can record the time differentials between exercise host computing systems 320 and exercise management server 302 and accurately report monitoring results. The time check agent may be used in cases where the clocks of each of exercise host computing systems 320 are not necessarily synchronized.

Another type of parameter that may be included in metric parameters 342 is an agent's operational mode. The principal modes for agents 214, according to certain examples, are to either terminate after executing their respective commands or to stay resident for the purposes of returning additional data at a later time. In the latter case, a persistent agent can either actively poll the state of exercise host computing system 320A (e.g., to take repeated measurements) or use an operating system hook (e.g., via option operating-system specific library 334, which may be specific to the operating system used by exercise host computing system 320A) to passively monitor exercise host computing system 320A and wait for events. In various examples, agents 214, including agent 314A, are capable of running in each of these modes.

In some cases, task observables 344, 346 may indicate at least one event that is associated with at least one action that is performed by a trainee within a virtual training environment during a training exercise using exercise host computing system 320A.

In various examples, planning module 310, evaluation module 312, and/or monitoring and transmission control system 304 may determine one or more metrics that are usable to determine if one or more skills have been demonstrated by a trainee during a training exercise. These components can identify certain types of task observables that can be collected by exercise host computing system 320A in order to calculate these one or more metrics. Monitoring and transmission control system 304 may then provide metric parameters 342 to configure metric plugins 332 of agent 314A to collect VT observables data 344 and AI entity observables 346 that are used to calculate these metrics for use by evaluation module 212. Evaluation module 212 may then determine whether one or more skills represented in a GUI report have been demonstrated by the trainee during the training exercise by calculating, based on task observables 344, 346, the one or more metrics to determine if the one or more skills have been demonstrated.

Figure 4:
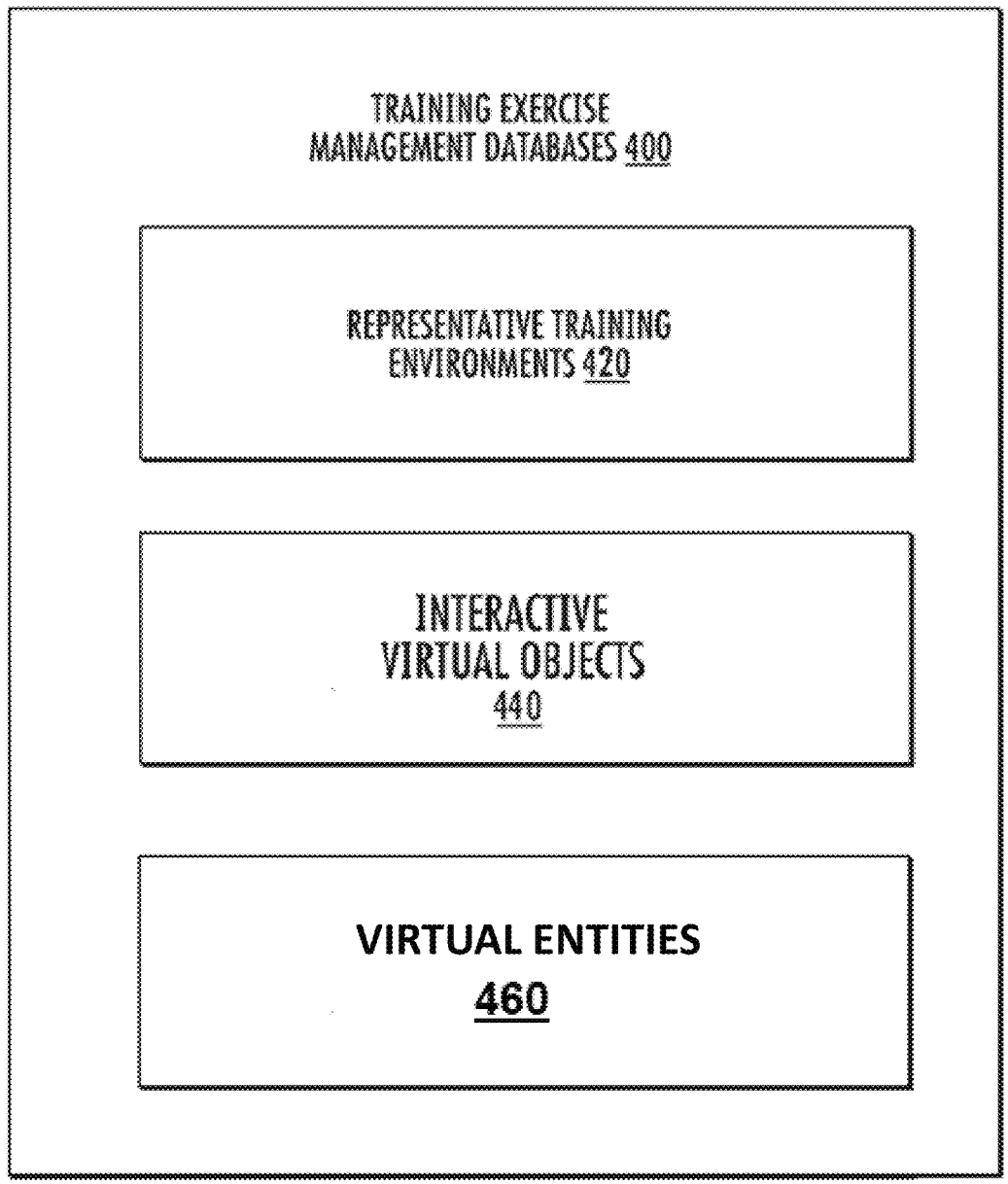
FIG. 4 is a block diagram illustrating example training exercise management databases, according to an embodiment.

FIG. 4 is a block diagram illustrating example exercise management databases 400 in accordance with the present disclosure. Databases 400 are an example of the database 208 associated with exercise management server 202 of FIG. 2. In various embodiments, representative training environments 420 present realistic virtual training scenarios that effectively prepare trainees for real-world situations. In an embodiment, virtual training scenarios measure observation and orientation skills based on the OODA loop developed by United States Air Force Colonel John Boyd, wherein "OODA" is an acronym for Observe, Orient, Decide, and Act. The OODA loop is a four-step approach to decision-making that focuses on filtering available information, putting it in context and quickly making the most appropriate decision while also understanding that changes can be made as more data becomes available. The observe step identifies the problem or threat and gains an understanding of the internal and external environment. The orient step reflects on what has been found during observations and considers what should be done next, e.g., based on situational awareness and understanding. The decided step makes an informed decision, having gathered information and oriented the actor, and the actor executes this decision in the act step. Considering the OODA loop as a cycle, any information which the actor gathers from the results of his actions can be used to restart the analytical process.

In an embodiment, a virtual training scenario incorporates a series of learning objectives based on the OODA loop to be accomplished sequentially by the trainee during the training exercise. A virtual training environment 420 includes a series of interactive virtual objects 440 and Virtual Entities 460, and the training exercise monitors task observables representative of trainee interactions with these objects 440, 460 demonstrating observation and orientation (cognitive skills), and action skills (psychomotor skills). Visual observations are a primary type of observation skills, such as tracking and visual diagnostic skills, particularly in VR 3D training environments. Observations in virtual training environments also can include auditory observations, which are particularly important in anti-submarine warfare, for example.

In the present disclosure, "cognitive skills" may refer to an individual's ability to learn, process and understand information. In various embodiments, levels of achievement in the cognitive domain may include knowledge, comprehension, application, analysis, synthesis and evaluation. "Psychomotor skills" may refer to physical skills such as movement, coordination, manipulation, dexterity, strength, speed and actions that demonstrate fine or gross motor skills. In various embodiments, levels of achievement in the psychomotor domain may include perception and awareness, guided response, mechanism, complex overt response, adaptation and origination.

In various embodiments, Representative Training Environments 420 comprise interactive 3D audio-video content that depicts training scenarios. In an embodiment, Representative Training Environments 420 support an immersive training experience. In various embodiments, Representative Training Environments 420 incorporate interactive 3D virtual objects 440 as key components of virtual 3D training environments.

In various embodiments, representative training environments 420 include CGI imagery tailored to accurately reflect real-life analogs. In an embodiment, both visual effects and live action photography may be used in production of representative training environments. In various embodiments, representative training environments may incorporate pre-existing imaging assets, such as CAD files for equipment featured in representative training environments.

In an embodiment, representative training environments utilize VR photography techniques to capture or create a complete scene as a single image, as viewed when rotating about a single central position. In an embodiment, representative training environments 420 incorporate interactive virtual objects 440 within virtual 3D training environments. In an embodiment, representative training environments 420 incorporate VR panoramas as an interactive way to observe a scene in a wide angle panorama using a full 360° seamless image of an object that incorporates the object's whole surroundings in a single frame.

In an embodiment, interactive virtual objects 440 include a plurality of object states used in collective task observables during training exercises. In an embodiment, task observables include one or both of a state of the virtual training environment at a point in time, and a change to state of the virtual training environment at a point in time or during a period of time. In various embodiments, host computing systems automatically monitor interaction event data representative of trainee interactions with one or more of the interactive virtual objects 440 during a virtual training exercise. In an embodiment, the virtual training system automatically monitors one or more trainee input actions performed within a virtual training environment correlated with the state of each of the one or more of the interactive virtual objects 440.

In an embodiment of a virtual training game experience, virtual entities 460 are members of a virtual entity red team which analyzes the players' moves. Virtual entities are configured, based on the moves that players make, to make the game harder or easier to help the players more effectively learn a new skill.

In various embodiments, virtual entities utilize machine learning to adapt to a user's behavior, e.g., by collecting data on movements and actions. Data collected and generated by virtual entities are monitored by Monitoring Agents 120 and used at the end of the game as input to the report creator module 130 to create a game report. In an embodiment, virtual entities incorporate a shared machine learning model. In an embodiment, a plurality of virtual entities incorporate multiple machine learning models respectively adapted to different types of virtual entities.

In various embodiments, for virtual entities 460, a predictive machine learning model is continually trained by inputting one or more of mission data, laboratory-performed simulations, and equipment testing and training conducted in real-life conditions.

Figure 5:
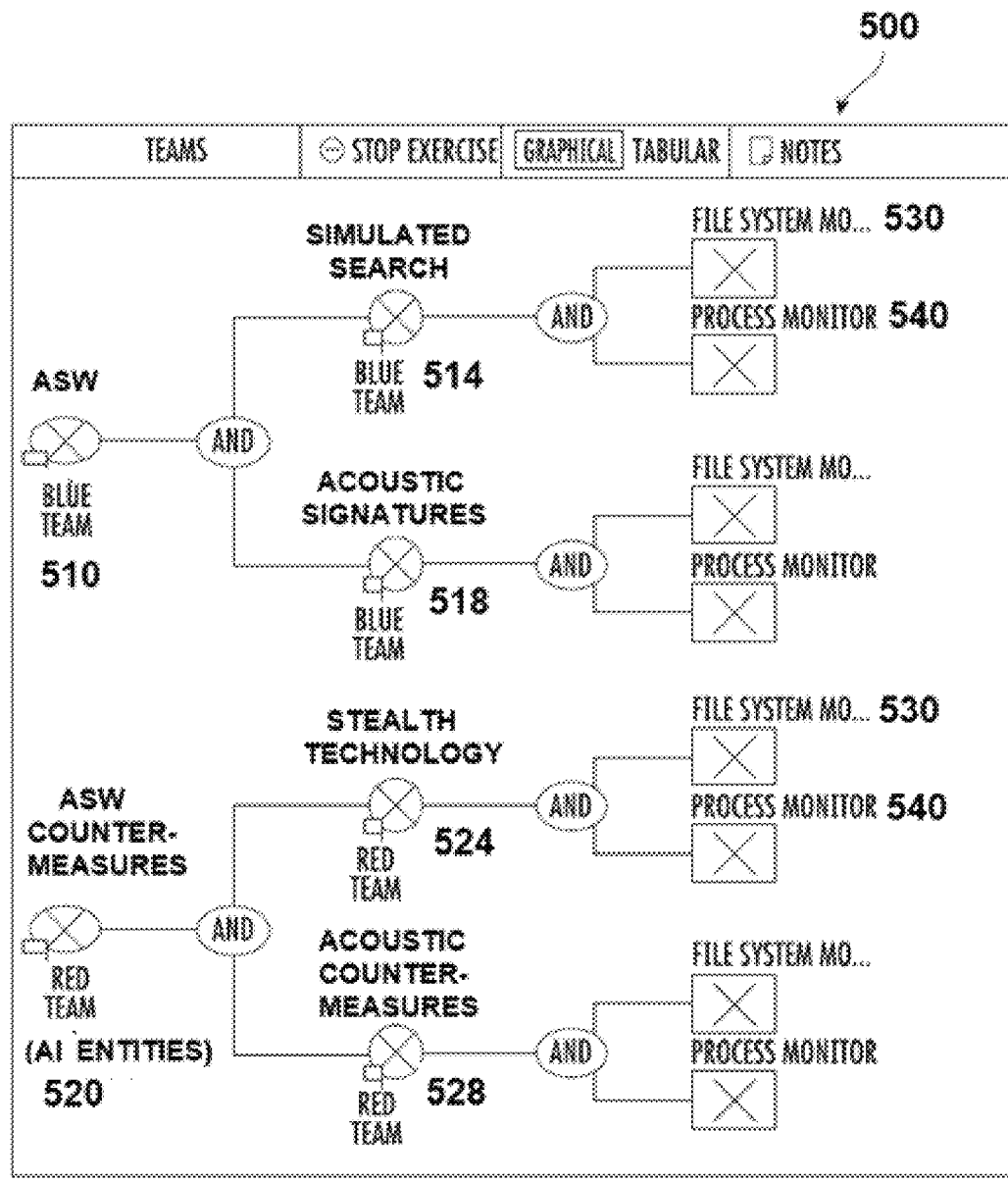
FIG. 5 is a screen diagram illustrating an example learning view provided by an evaluation module for a team exercise, according to an embodiment.

In various embodiments, the planning module 210 may incorporate forms for assigning teams to training exercise objectives or skills, and the evaluation module 212 may incorporate forms that provide team exercise results. FIG. 5 is a screen diagram illustrating a training view (e.g., graphical tree) of a Team Exercise section 500 of the evaluation module. When running a team exercise, a hierarchy of learning objectives and skill nodes display the team flag. Learning objective 510 and skill nodes 514, 518 display the blue team flag for the team of trainees. Learning objective 520 and skill nodes 524, 528 display the red team flag for the opposing team of Virtual entities.

In an embodiment, individual nodes have a particular color or include an "X" for corresponding objectives that have not yet been accomplished, skills that have not yet been demonstrated, and/or agents whose evaluation criteria have not yet been satisfied. In addition, logical operators (e.g., "AND" operators, "OR" operators) may be associated with one or more of the nodes in the hierarchy. In an example, as the agents return parameter data that evaluate to true based on the evaluation criteria, the learning objective tree is evaluated and nodes change to another color (e.g., green) and/or change the "X" within the respective nodes to a checkmark, graphically indicating a true, or "pass," evaluation.

In various embodiments, data from team dashboard 500 may be summarized in various reports. In an embodiment, a user may select a report to show the number and percentage of objectives, skills and/or agents that have evaluated to true in the learning view/graphical tree. In an embodiment, a user may select a report to view individual objectives and/or skills that have been met or not met, such as in a drop-down menu or field.

On team dashboard 500, individual nodes are assigned to teams within the tree representing opposing objectives of an adversarial training exercise. Objective 510, ASW is assigned to the blue team. Objective 510 includes skill nodes 514, Simulated Search and 518, Acoustic Signatures. Objective 520, ASW Countermeasures is assigned to the red team (virtual entities). Objective 520 includes skill nodes 524, Stealth Technology, and 528, Acoustic Countermeasures.

In an embodiment, for skill nodes 524, 528 assigned to the virtual entities, the skills to be demonstrated by trainees are skills of the virtual training exercise represented by AI entity observables generated by the virtual entities. In an example, red team's execution of stealth technology 524 imposes blue team skills to overcome the stealth technology using advanced sensors and successfully detect a virtual entity. In an example, the red team's execution of acoustic countermeasures 528 imposes additional blue team skills to overcome the acoustic countermeasures.

Figure 6:
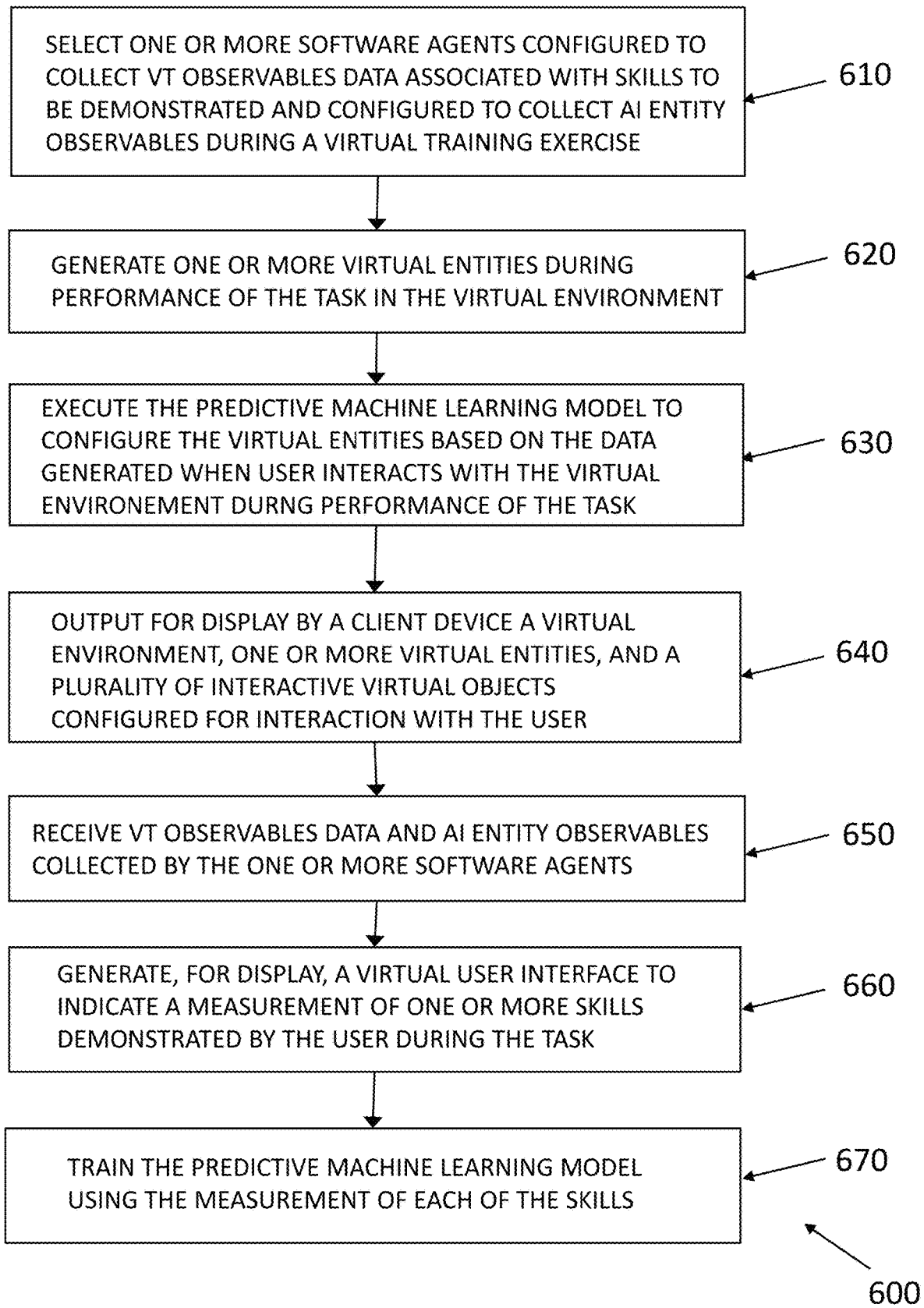
FIG. 6 is a flow diagram illustrating a process performed by a training management server, according to an embodiment.

FIG. 6 is a flow diagram illustrating an example process that may be performed by a management server, such as exercise management server 102 illustrated in FIG. 1. In the example of FIG. 6, the process includes operations 610, 620, 630, 640, 650, 660, and 670.

In this example, players in a multi-player ASW training game are connected to a task management web server 100 hosting a virtual training environment 110 including interactive 3D virtual objects. During a multi-player mode of game play, players in a shared session were connected to the same server state, which was updated based on each player's actions. The virtual training system tracked how each player behaved in the given scenario, and analyzed this information to assign a score to each player at the end of the game.

At the end of the game, evaluators and players obtained the results of the game-based training session. These results were computed by the report creator 130, which used machine learning to analyze the data collected by monitoring agents 120. The training report 180 displayed information that helped the players and evaluators understand what additional training players might need in order to improve their skills. The training report helped ASW users and evaluators decide which refresher courses users would need to maintain their skills for peak performance.

In some embodiments, virtual training simulations for ASW incorporated several elements of sonar signal return processing to provide an efficient and lifelike training environment for ASW personnel. The training scenario employed a noise sample file generated from mimicking background noise detected in the ocean to define a representative virtual training environment. Various virtual training scenarios modeled variable sea-states based on exogenous variables such as wind speed, time-of-year, geographical location of ASW platforms, and other parameters known in undersea warfare.

The noise sample file provided an acoustic background for two interactive virtual objects in the virtual training environment, a sonar transmitter and a sonar receiver. In modeling active sonar equipment, the background noise signature was many magnitudes less than the active sonar return from these contacts because of the magnitude of the reflected acoustic energy. In modeling return signal mixing in the reverberation field, the reverberation emulation signal and a reflected and attenuated base signal were mixed at a calculated time of return. The duration and magnitude of the active sonar signal within the simulated reverberation envelope provided a realistic active sonar simulation.

In various embodiments of ASW virtual training, virtual entities represented targets of transmitted and returned active sonar signals. Targets in active sonar simulations included objects such as surface ships, submarines, natural obstructions and sea creatures that inhabit the ocean environment and that produce return echoes from signals received from the sonar transmitter.

In a virtual training exercise, the target was an unknown object moving in the water, and the trainee was expected to distinguish a malicious submarine from a friendly submarine or a sea creature. In order to investigate the object, the trainee was expected to detect the object's signature, look up the signature in a database of signatures associated with malicious and friendly submarines, and log findings (e.g., a suspected malicious submarine).

In an ASW training scenario based on a team game experience, the virtual environment provided team members with a virtual sonar system with a random abnormality. Users were required to observe and react to sonar abnormalities. The task management system measured how quickly each user had responded to an abnormality, and measured how closely the user had followed the appropriate protocol. The training exercise provided each trainee a report (result sheet) at the end of game play.

In a task management system for ASW training, virtual entities of the task management system incorporated a predictive machine learning model configured to generate AI entity observables signals simulating targets in anti-submarine warfare. The predictive machine learning models were continually trained in order to provide more realistic target simulations. Model training data included mission data, laboratory-performed simulations, and equipment testing and training conducted in real-life conditions. In an embodiment, training data included data obtained from the Synthetic Environment Tactical Integration, or SETI, program of the Naval Undersea Warfare Center. The Naval Undersea Warfare Center is the United States Navy's research, development, test and evaluation, engineering and fleet support center for submarines, autonomous underwater systems, and offensive and defensive weapons systems associated with undersea warfare.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc., are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
executing, by a server, one or more software agents configured to collect data generated when a user interacts with a three dimensional (3D) virtual environment to perform a task within the virtual environment on a client device, wherein during performance of the task the one or more software agents measure one or more skills for the task, wherein the 3D virtual environment includes visual and/or auditory images representing a plurality of interactive 3D virtual objects;
generating, by the server, one or more virtual entities during the performance of the task within the 3D virtual environment;
executing, by the server, a predictive machine learning model to configure the one or more virtual entities within the 3D virtual environment based upon the data generated when the user interacts with the 3D virtual environment to perform the task and the one or more skills for the task;
generating, by the server for display by the client device, the 3D virtual environment and the one or more virtual entities configured for interaction with the user;
receiving, by the server, the data collected by the one or more software agents during the performance of the task within the 3D virtual environment, wherein the data collected by the one or more software agents during the performance of the task include one or more skill metrics for determining demonstration of skills for the task during interaction of the user with at least one of the plurality of interactive 3D virtual objects;
determining, by the server, one or more additional skills for performance of the task based upon the received data, wherein the one or more software agents monitor the one or more additional skills during the performance of the task within the virtual environment;
generating, by the server for display by the client device, a user interface to indicate a measurement of each of the one or more skills, the one or more additional skills, and the one or more skill metrics during the performance of the task in the virtual environment; and
training, by the server, the predictive machine learning model using the measurement of each of the one or more skills, the one or more additional skills, and the one or more skill metrics.

2. The method of claim 1, wherein the one or more virtual entities generate one or more virtual entity outputs based upon the data generated when the user interacts with the 3D virtual environment to perform the task.

3. The method of claim 2, wherein the one or more virtual entity outputs are representative of the one or more additional skills for the task, wherein the one or more software agents are further configured to collect the one or more virtual entity outputs generated when the user interacts with the 3D virtual environment to perform the task.

4. The method of claim 3, further comprising the steps of receiving the one or more virtual entity outputs collected by the one or more software agents during the performance of the task, and generating the user interface to indicate a measurement of each of the one or more skills and the one or more additional skills during performance of the task in the 3D virtual environment.

5. The method of claim 1, wherein one or more virtual entities comprise programming objects that provide mapping between nodes in a training scenario, observable entities in the 3D virtual environment, and variables during performance of the task.

6. The method of claim 1, wherein the client device comprises a plurality of client devices associated with members of a team, wherein the one or more skills comprise collaborative skills to be demonstrated by the members of the team.

7. The system of claim 1, wherein the task represents an adversarial scenario, wherein the client device comprises a plurality of client devices associated with members of a first team in the adversarial scenario, and wherein the one or more virtual entities represent a second team in the adversarial scenario.

8. The method of claim 1, wherein the client device comprises a plurality of client devices associated with respective users, wherein the 3D virtual environment includes respective visual and/or auditory images representing presence of each user of a respective client device, wherein the 3D virtual environment includes visual and/or auditory images representing presence of each of the one or more virtual entities.

9. The method of claim 1, wherein the at least one of the plurality of interactive 3D virtual objects include a plurality of object states.

10. The method of claim 9, further comprising the step of automatically identifying one of the plurality of object states of the at least one of the plurality of interactive virtual objects when the user interacts with the 3D virtual environment on the client device, wherein the identified object state includes the one or more skill metrics for determining the demonstration of skills for the task during the user interaction.

11. The system of claim 1, wherein the one or more skills and the one or more additional skills demonstrated by the user of the client device during the performance of the task comprise one or more of cognitive skills demonstrated with respect to one or more of the plurality of interactive 3D virtual objects and psychomotor skills demonstrated with respect to one or more of the plurality of interactive 3D virtual objects.

12. The method of claim 1, wherein the 3D virtual environment comprises a 3D virtual reality environment and the plurality of interactive 3D virtual objects are configured for display by a near-to-eye display device.

13. The method of claim 1, wherein the predictive machine learning model is continually trained by inputting one or more of mission data, laboratory-performed simulations and equipment testing and training conducted in real-life conditions.

14. A system comprising:
a server;
non-transitory machine-readable memory that stores one or more software agents, a three-dimensional (3D) virtual environment that includes visual and/or auditory images representing a plurality of interactive 3D virtual objects, and a predictive machine learning model, wherein the server in communication with the non-transitory machine-readable memory executes a set of instructions instructing the server to:
execute the one or more software agents configured to collect data generated when a user interacts with the 3D virtual environment to perform a task within the 3D virtual environment on a client device, wherein during performance of the task the one or more software agents measure one or more skills for the task;

generate one or more virtual entities during the performance of the task within the 3D virtual environment;

execute the predictive machine learning model to configure the one or more virtual entities within the 3D virtual environment based upon the data generated when the user interacts with the 3D virtual environment to perform the task and the one or more skills for the task;

generate, for display by the client device, the 3D virtual environment and the one or more virtual entities configured for interaction with the user;

receive the data collected by the one or more software agents during the performance of the task within the 3D virtual environment, wherein the data collected by the one or more software agents include one or more skill metrics for determining demonstration of skills for the task during user interaction with at least one of the plurality of interactive 3D virtual objects;

determine one or more additional skills for performance of the task based upon the received data, wherein the one or more software agents monitor the one or more additional skills during the performance of the task within the 3D virtual environment;

generate, for display by the client device, a user interface to indicate a measurement of each of one or more skills, the one or more additional skills, and the one or more skill metrics collected during the performance of the task in the 3D virtual environment; and train the predictive machine learning model using the measurement of each of the one or more skills, the one or more additional skills, and the one or more skill metrics.

15. The system of claim 14, wherein the one or more virtual entities are configured to generate one or more virtual entity outputs representative of the one or more additional skills for the task based upon the data generated when the user interacts with the 3D virtual environment, wherein the one or more software agents are further configured to collect the one or more virtual entity outputs generated when the user interacts with the 3D virtual environment.

16. The system of claim 15, wherein the set of instructions further instruct the processor to receive the one or more virtual entity outputs collected by the one or more software agents during the performance of the task, and generate the user interface to indicate a measurement of each of the one or more skills, the one or more additional skills, and the one or more skill metrics collected during performance of the task in the 3D virtual environment.

17. The system of claim 14, wherein the client device comprises a plurality of client devices associated with respective users, wherein the 3D virtual environment includes respective visual and/or auditory images representing presence of each user of a respective client device and includes visual and/or auditory images representing presence of each of the one or more virtual entities.

18. The system of claim 14, further comprising a near-to-eye display device, wherein the 3D virtual environment comprises a 3D virtual reality environment configured for display by the near-to-eye display device.

19. The system of claim 14, wherein the one or more virtual entities comprise programming objects that provide mapping between nodes in a training scenario, observable entities in the 3D virtual environment, and variables during performance of the task.

20. The system of claim 14, wherein the predictive machine learning model is continually trained by inputting one or more of mission data, laboratory-performed simulations and equipment testing and training conducted in real-life conditions.

* * * * *